US012559997B1

(12) United States Patent
Szegeny

(10) Patent No.: US 12,559,997 B1
(45) Date of Patent: Feb. 24, 2026

(54) MOTOR VEHICLE LOCK, IN PARTICULAR MOTOR VEHICLE DOOR LOCK

(71) Applicant: KIEKERT AG, Heiligenhaus (DE)

(72) Inventor: Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 61 days.

(21) Appl. No.: 18/689,186

(22) PCT Filed: Aug. 19, 2022

(86) PCT No.: PCT/DE2022/100622

§ 371 (c)(1),
(2) Date: Mar. 5, 2024

(87) PCT Pub. No.: WO2023/036365

PCT Pub. Date: Mar. 16, 2023

(30) Foreign Application Priority Data

Sep. 9, 2021 (DE) ..................... 10 2021 123 330.5

(51) Int. Cl.
*E05B 81/82* (2014.01)
*E05B 77/34* (2014.01)
*E05B 81/04* (2014.01)

(52) U.S. Cl.
CPC .............. *E05B 81/82* (2013.01); *E05B 77/34* (2013.01); *E05B 81/04* (2013.01)

(58) Field of Classification Search
CPC .......... E05B 81/82; E05B 81/04; E05B 81/90; E05B 81/02; E05B 81/06; E05B 81/14; E05B 77/34; E05B 77/265
USPC ........................................ 70/227, 287.7, 237
See application file for complete search history.

(56) References Cited

U.S. PATENT DOCUMENTS

| | | | | |
|---|---|---|---|---|
| 6,056,076 | A * | 5/2000 | Bartel | E05B 81/54 180/271 |
| 6,349,983 | B1 * | 2/2002 | Dupont | E05B 81/14 292/216 |
| 9,512,651 | B2 * | 12/2016 | Taurasi | E05B 81/90 |
| 10,472,868 | B2 * | 11/2019 | Nozawa | E05B 81/16 |
| 11,280,120 | B2 * | 3/2022 | Patane | E05B 81/34 |
| 11,441,339 | B2 * | 9/2022 | Iwata | E05B 81/04 |

(Continued)

FOREIGN PATENT DOCUMENTS

| | | | | |
|---|---|---|---|---|
| DE | 1169328 B * | 4/1964 | | |
| DE | 4100524 A1 * | 7/1991 | | E05B 77/36 |

(Continued)

OTHER PUBLICATIONS

FR2775718 Espacenet machine translation claims and description (Year: 2025).*

(Continued)

*Primary Examiner* — Steven A Tullia
(74) *Attorney, Agent, or Firm* — Renner, Otto, Boisselle & Sklar, LLP

(57) ABSTRACT

A motor vehicle lock, in particular a motor vehicle door lock, which is equipped with an electromotive drive and an electric emergency power source for actuating the drive in the event of an emergency. The emergency power source is arranged in the interior of a motor vehicle lock housing. According to the invention, the emergency power source is located in the region of an engagement opening for a locking mechanism.

14 Claims, 4 Drawing Sheets

(56) References Cited

U.S. PATENT DOCUMENTS

| | | | | |
|---|---|---|---|---|
| 2006/0005591 | A1* | 1/2006 | Belmond | E05B 81/06 70/277 |
| 2010/0052337 | A1* | 3/2010 | Arabia, Jr. | E05B 81/82 292/216 |
| 2011/0204673 | A1* | 8/2011 | Cumbo | E05B 81/06 70/141 |
| 2019/0161996 | A1* | 5/2019 | Taurasi | E05B 81/36 |
| 2020/0157858 | A1 | 5/2020 | Iwata | |
| 2020/0386016 | A1 | 12/2020 | Graute | |
| 2021/0148143 | A1 | 5/2021 | Ney | |
| 2023/0211724 | A1* | 7/2023 | Bendel | E05B 17/10 49/394 |
| 2023/0352955 | A1* | 11/2023 | Müller | E05B 81/82 |

FOREIGN PATENT DOCUMENTS

| | | | | | |
|---|---|---|---|---|---|
| DE | 4228234 | A1 | * | 3/1994 | E05B 81/82 |
| DE | 10211937 | A1 | * | 10/2003 | E05B 81/90 |
| DE | 20312347 | U1 | * | 10/2003 | E05B 81/90 |
| DE | 19654956 | B4 | * | 6/2005 | E05B 81/80 |
| DE | 10164829 | B4 | | 7/2006 | |
| DE | 102006002119 | A1 | * | 7/2006 | G07C 9/00309 |
| DE | 102011015669 | A1 | | 10/2012 | |
| DE | 102014003505 | A1 | * | 9/2015 | E05B 17/10 |
| DE | 102014105873 | A1 | * | 10/2015 | E05B 81/86 |
| DE | 102014105874 | A1 | | 10/2015 | |
| DE | 102014105875 | A1 | | 10/2015 | |
| DE | 102015109494 | A1 | * | 12/2015 | E05B 81/54 |
| DE | 112014004455 | T5 | * | 6/2016 | E05B 81/56 |
| DE | 102015205343 | A1 | * | 9/2016 | E05B 81/64 |
| DE | 102017125719 | A1 | * | 5/2019 | E05B 81/16 |
| DE | 102018120447 | A1 | * | 2/2020 | E05B 81/86 |
| DE | 102020104846 | A1 | * | 8/2021 | E05B 81/86 |
| DE | 10 2021 101 228 | A1 | | 7/2022 | |
| EP | 1126106 | A1 | * | 8/2001 | E05B 81/06 |
| EP | 1394342 | A2 | * | 3/2004 | E05B 81/25 |
| FR | 2775718 | A1 | * | 9/1999 | E05B 81/82 |
| FR | 2807463 | A1 | * | 10/2001 | E05B 81/54 |
| FR | 2918403 | A1 | * | 1/2009 | E05B 81/06 |
| FR | 3077597 | A1 | * | 8/2019 | E05B 81/82 |
| JP | 2000064685 | A | * | 2/2000 | |
| JP | 2002295097 | A | * | 10/2002 | E05B 65/32 |
| JP | 2003262054 | A | * | 9/2003 | G07C 9/00309 |
| JP | 2007009625 | A | * | 1/2007 | |
| JP | 2013014943 | A | * | 1/2013 | E05B 65/20 |
| WO | WO-2016058586 | A1 | * | 4/2016 | E05B 79/08 |
| WO | WO-2016058590 | A1 | * | 4/2016 | E05B 85/243 |
| WO | WO-2019068276 | A1 | * | 4/2019 | E05B 81/90 |
| WO | WO-2019068277 | A1 | * | 4/2019 | E05B 81/14 |
| WO | 2021023341 | A1 | | 2/2021 | |
| WO | 2022156844 | A1 | | 7/2022 | |

OTHER PUBLICATIONS

JP2000064685 Espacenet machine translation claims and description (Year: 2025).*

International Search Report mailed Nov. 3, 2022, for priority International Application No. PCT/DE2022/100622.

* cited by examiner

MOTOR VEHICLE LOCK, IN PARTICULAR MOTOR VEHICLE DOOR LOCK

This application is a national phase of International Patent Application No. PCT/DE2022/100622 filed Aug. 19, 2022, which claims priority to German Patent Application No. 10 2021 123 330.5 filed Sep. 9, 2021, which is hereby incorporated herein by reference in its entirety.

FIELD OF DISCLOSURE

The invention relates to a motor vehicle lock, in particular a motor vehicle door lock, with an electromotive drive, and with an electrical emergency energy source for the electrical emergency operation of the drive, wherein the emergency energy source is arranged in the interior of a motor vehicle lock housing.

BACKGROUND OF DISCLOSURE

Motor vehicle locks, and in particular motor vehicle door locks, which have an electromotive drive, are configured and designed as electric locks by way of example and for electrically opening a locking mechanism realized inside the motor vehicle lock and consisting substantially of a catch and a pawl. In principle, however, it is also possible that the electromotive drive is not (only) used to open the locking mechanism electrically, but can alternatively or additionally also be used to actuate a so-called opener. In principle, the electric lock can be of the type described in DE 101 64 829 B4. If the electromotive drive is to be used to power an opener, for example, it may be designed in a similar manner to that described in DE 10 2011 015 669 A1.

In principle, however, the electromotive drive can also be used as a component of the motor vehicle lock to actuate an operating lever chain inside the motor vehicle lock, for example to transfer it from the "locked" functional position to the "unlocked" functional position. All of these functions can regularly only be mapped and converted if the electromotive drive is supplied with sufficient electrical energy. This electrical energy usually comes from a main energy source or an accumulator on the vehicle.

If, for example, there is a voltage drop in this main energy source or if it is damaged, the functions mentioned above in terms of "opening electrically", "turning off" or "unlocking" cannot be converted, at least no longer by electric motor. For this reason, there are already approaches in the prior art to realize an emergency energy storage or an emergency energy source.

For example, WO 2021/023341 A1 of the applicant describes a motor vehicle lock which is equipped with an electromotive drive for an operating lever chain and in particular a locking chain and additionally an emergency energy storage for the electrical supply of the drive in the course of an emergency operation and in particular emergency unlocking. In the example, the emergency energy storage ensures that after an authentication check of an access-willing operator, a locking lever chain provided at this location is transferred from its "locked" position to the "unlocked" position.

The generic prior art according to DE 10 2014 105 875 A1 relates to a motor vehicle lock arrangement which is additionally equipped with an emergency supply arrangement for the voltage supply of the motor vehicle lock in emergency operation. For this purpose, the known emergency supply arrangement is arranged inside a motor vehicle lock housing. In addition, a so-called auxiliary opening drive for the motorized lifting of a pawl is implemented.

The prior art has basically proven itself with regard to the basic possibility of electrical emergency operation of the electromotive drive as part of a motor vehicle lock. However, the electrical emergency energy sources used at this location are not free of defects either. The electrical emergency energy sources can in fact be capacitors, batteries, etc. Such emergency energy sources, like a vehicle battery as the main energy source, are also subject to ageing and can discharge particularly over long time scales. In practice, this aspect is addressed by charging the respective electrical emergency energy source on a regular or permanent basis. However, this does not stop the effects of ageing, which in the worst case could mean that the emergency energy source is also not available to supply electrical energy to the electromotive drive if the main energy source or vehicle battery fails. The invention as a whole seeks to remedy this.

SUMMARY OF DISCLOSURE

The invention is based on the technical problem of providing a motor vehicle lock in such a manner, and in particular a motor vehicle door lock, which enables a simplified and routine replacement of the emergency energy source.

To solve this technical problem, a generic motor vehicle lock and particularly a motor vehicle door lock within the scope of the invention is characterized in that the emergency energy source is arranged in the area of an inlet mouth for a locking mechanism.

First of all, the invention is based unchanged on a motor vehicle lock which is equipped with an emergency electrical energy source in order to ensure emergency operation of the electromotive drive, for example in the event of a failure of the main energy source or vehicle battery. In this context, the electromotive drive can be used as an example and not restrictively for electrically opening a locking mechanism consisting of a catch and a pawl. In addition, the electromotive drive can also be used to supply an opener as a component or associated aggregate with the required electrical energy. Further, the electromotive drive—as described—can be used to actuate an operating lever chain, for example to transfer it from the "locked" state to the "unlocked" functional state.

To ensure that this can also be carried out and realized safely in the event of a failure of the vehicle battery or main energy source, the emergency energy source inside the motor vehicle lock housing can be replaced at regular intervals according to the invention or can be easily checked for its functionality. In accordance with the invention, the emergency energy source is arranged in the area of the inlet mouth for the locking mechanism consisting substantially of a catch and a pawl. The invention is based on the realization that when the motor vehicle door belonging to the motor vehicle lock is open, the inlet mouth in question is directly accessible for the locking mechanism. This means that the emergency energy source can also be easily checked and replaced if necessary. The emergency energy source usually has a detachable cover for this purpose.

In fact, the cover can advantageously be arranged in a recess for the receptacle of a lock holder, which interacts with the locking mechanism. As soon as the motor vehicle door is opened and the lock holder exposes the recess in question, the emergency power source is accessible via the detachable cover. This means that the emergency power source can be removed and replaced if necessary, but also checked and even repaired if necessary.

For this purpose, the cover is usually equipped with guide tongues on both sides. This provides and realizes a perfect mounting of the cover in the area of the inlet mouth. In addition, the cover is usually designed as a sliding bar and can therefore be opened and closed by a sliding movement.

In addition, the cover usually closes a compartment for the receptacle of the emergency power source on the head side. This means that the emergency energy source is housed inside the compartment, which in turn is closed at the top by the cover, which can be detached. At this point, a further design has proven to be particularly advantageous, in which the compartment for receptacle of the emergency energy source extends predominantly perpendicular to a locking mechanism level. This means that the locking mechanism, consisting substantially of catch and pawl, opens the locking mechanism level in question. The compartment for the receptacle of the emergency energy source extends vertically to this locking mechanism level. The invention is based on the realization that there is usually enough space in the lock housing in this direction perpendicular to the locking mechanism level and in the extension of the inlet mouth to place the emergency energy source there.

The compartment for the receptacle of the note energy source is generally a component of a housing body. In fact, the lock housing is usually made up of at least two parts: the housing body and an additional housing cover. Of course, this only applies in the context of an advantageous design and is by no means mandatory. The compartment is a component of the housing body. The housing body generally defines a wet room housing part of the lock housing. Although the compartment is part of the housing body and thus of the wet housing part, it is generally designed to be closed in order to protect the emergency power source inside the compartment from any environmental influences and particularly moisture, so that it can continue to function for as long as possible.

As already explained, the housing body is generally closed with a housing cover. While the housing body defines the wet room housing part of the lock housing, the housing cover is usually responsible for defining a dry room housing part as a further component of the motor vehicle lock housing. The dry room housing part usually contains the electromotive drive and usually also an electronic control unit including the associated circuit board. Of course, this is only advantageous and is also not mandatory.

The result is a motor vehicle lock, and particularly a motor vehicle door lock, which has a functional design in such a manner that the emergency power source is arranged in the area of the inlet mouth for the locking mechanism. The emergency power source is housed in a compartment equipped with a removable cover and can therefore be easily removed from the compartment, checked, replaced or repaired if necessary. All of this is possible at least when a motor vehicle door equipped with the relevant motor vehicle lock is open and subsequently the inlet mouth is accessible for any manipulation of the emergency power source. This minimizes the need for maintenance, as the emergency energy source can be routinely checked or replaced during maintenance. These are the main advantages.

BRIEF DESCRIPTION OF DRAWINGS

In the following, the invention is explained in more detail with the aid of a drawing showing only an exemplary embodiment; in the figures:

In the drawings, a motor vehicle lock is shown, which is a motor vehicle door lock. It can be seen that the motor vehicle lock in question is equipped with a lock case 1, which is provided and configured for bearing a locking mechanism 2, 3 consisting of a catch 2 and a pawl 3, which are only indicated in FIG. 1. In FIG. 1, the catch 2 can be seen partially in the area of an inlet mouth 4, into which a body-side lock holder, not shown, can retract in order to interact with the locking mechanism 2, 3 in this manner. On the other hand, the motor vehicle lock shown in FIG. 1 is arranged on or inside a motor vehicle door not shown in detail.

Figure 1:
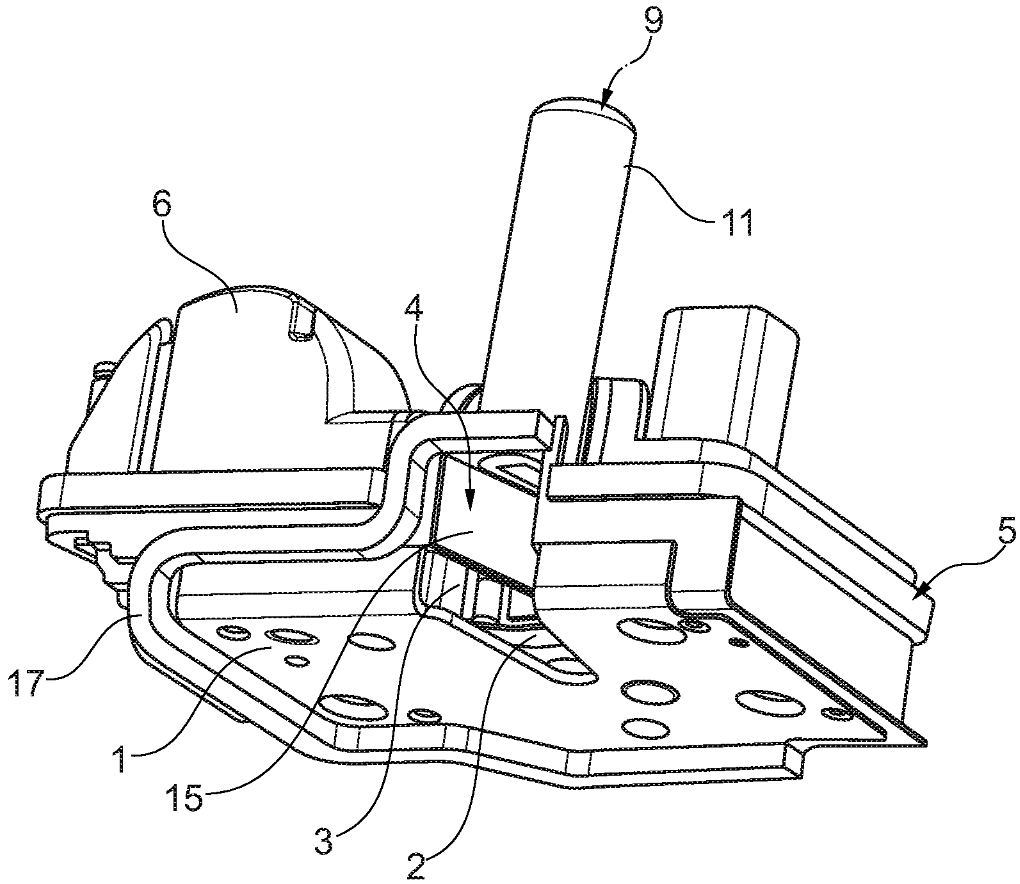
FIG. 1 shows a perspective view of the motor vehicle lock according to the invention.

The inlet mouth 4 is accessible when the motor vehicle door is in the open state. This is located, for example, on a face side of the motor vehicle door, which connects a motor vehicle outer panel and motor vehicle inner panel of the motor vehicle door. In addition to the lock case 1, another substantially structural element of the motor vehicle lock shown is a motor vehicle lock housing 5, 6. According to the exemplary embodiment, the motor vehicle lock housing 5, 6 is composed of a housing body 5 on the one hand and a housing cover 6 sealingly closing the housing body 5 on the other hand. This means that as soon as the housing body 5 is closed using the housing cover 6, moisture or environmental influences can only enter the interior of the motor vehicle lock housing via the inlet mouth 4.

The basic structure of the motor vehicle lock shown also includes an electromotive drive 7, 8, which, according to the exemplary embodiment, is equipped with an electric motor 7 and a driven pulley 8. With the aid of the driven pulley 8, the pawl 3 can be lifted from its locking engagement with the catch 2 in a closed position of the locking mechanism 2, 3. As a result, the catch 2 then opens spring-assisted and releases the locking bolt, which was previously inserted into the locking mechanism 2, 3 via the inlet mouth 4 and is not shown. This allows the motor vehicle door to be opened as a whole.

Figure 4:
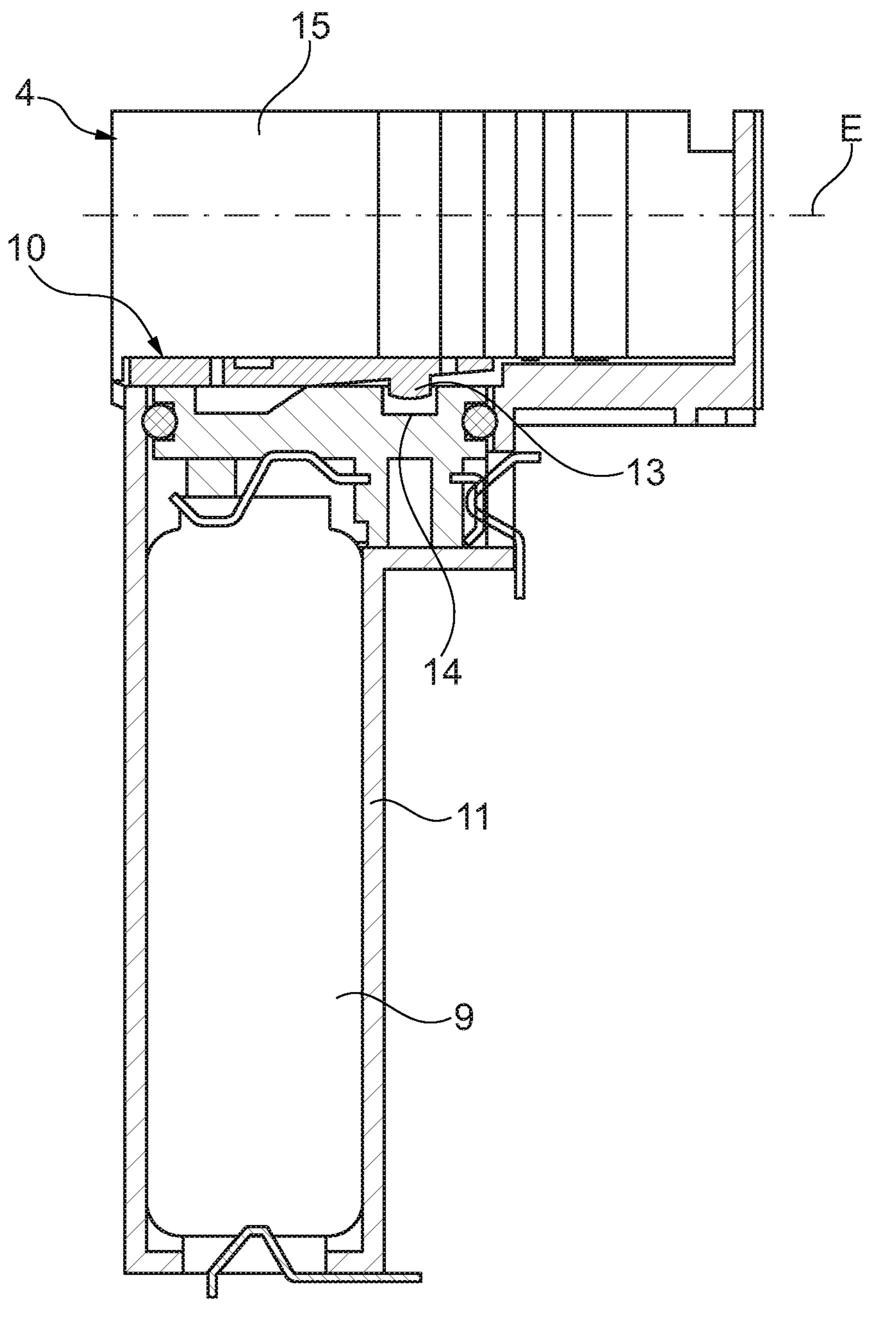
FIG. 4 shows a section through FIG. 3.

Of substantial importance for the invention is another emergency energy source 9, which can best be seen in section in FIG. 4. In the exemplary embodiment and not limiting, the emergency energy source 9 is a rechargeable or non-rechargeable battery. Of course, the emergency energy source 9 can also be designed differently, for example as a capacitor or whatever. Either way, in the event of a failure of a main energy source or vehicle battery not expressly shown, the emergency electrical energy source 9 ensures that the electromotive drive 7, 8 can alternatively be energized with the aid of the emergency electrical energy source 9 in order to be able to actuate and particularly open the locking mechanism 2, 3 in an emergency according to the exemplary embodiment.

Of course, the electromotive drive 7, 8 can alternatively also be used to transfer an operating lever chain not expressly shown from its "locked" state to the "unlocked" functional state, as already described at the beginning. Furthermore, it is within the scope of the invention if the electromotive drive 7, 8 operates on an opener not expressly shown, as has been explained in the introduction to the description.

According to the invention, the arrangement is now such that the emergency energy source 9 is arranged in the area of the inlet mouth 4 for the locking mechanism 2, 3 described above. For this purpose, a detachable cover 10 is assigned to the emergency power source 9.

Figure 3:
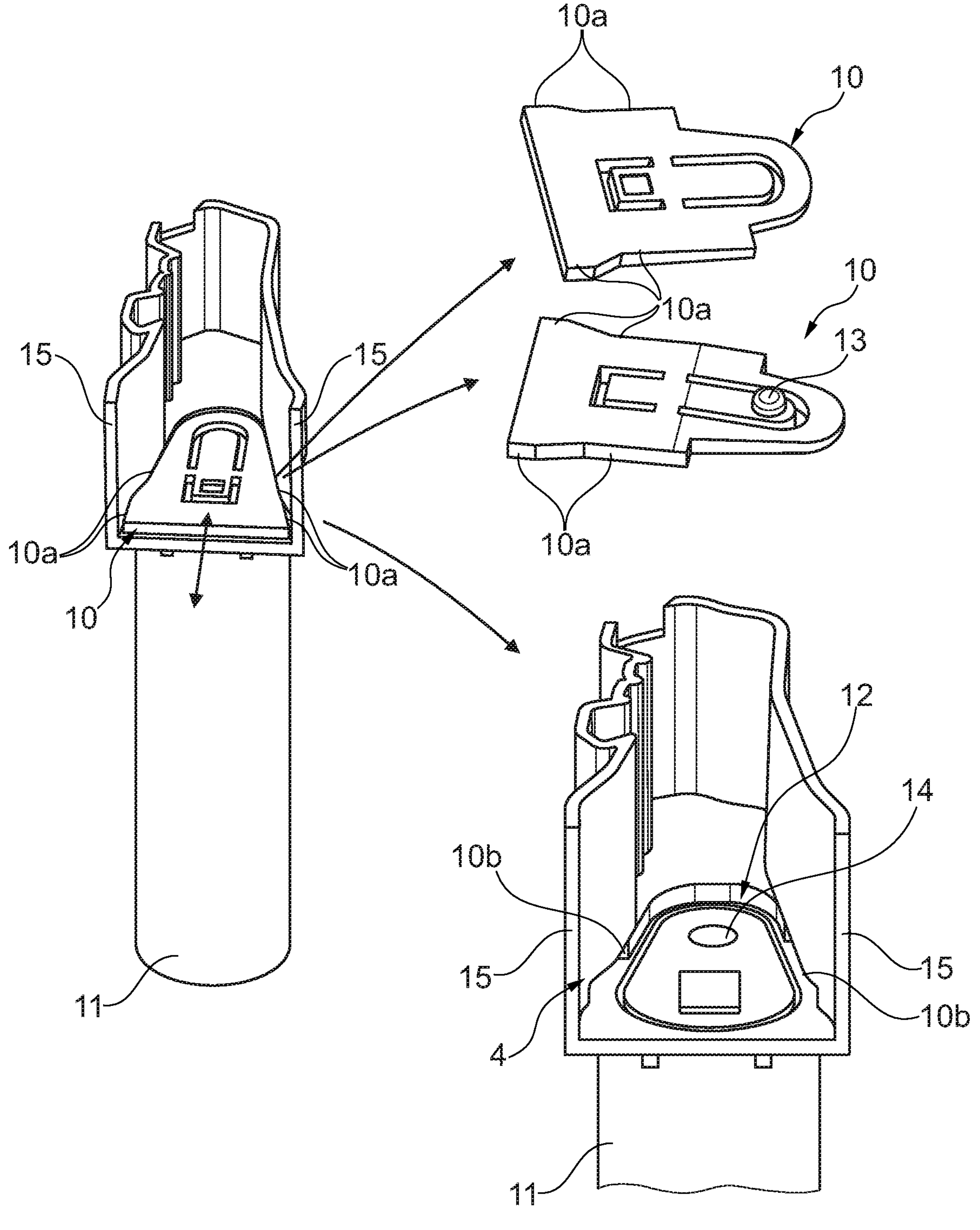
FIG. 3 shows a perspective view of the compartment for receptacle of the emergency energy source and finally

It can be seen that the emergency energy source 9 is accommodated in a compartment 11, which is closed at the head end by the detachable cover 10. Here, the detachable cover 10 is located overall in a recess 12, which is adapted to the lock holder that retracts into the inlet mouth 4 and is not explicitly shown. According to the embodiment example, the cover 10 is a sliding bar, i.e. a latch, which can be transferred into a closed state shown there and a released state by a sliding movement in the longitudinal direction of the inlet mouth 4, as indicated in FIG. 3, in order to be able to remove the emergency energy source 9 located inside the compartment 11 and replace it if necessary.

DETAILED DESCRIPTION

For this purpose, the detachable cover 10 or the sliding bar realized at this point has a latching cam 13 on the underside, which engages in an associated recess 14 inside the compartment 11 as soon as the cover 10 or the sliding bar assumes its correct position for closing the compartment 11 and the compartment 11 is thereby closed as a whole. In fact, this ensures that any contamination or moisture cannot enter the compartment 11 via the inlet mouth 4 via the detachable cover 10 and possibly disrupt the functionality of the emergency power source 9.

It can be seen that the cover 10 is equipped with guide tongues 10*a* on both sides, which in the assembled state of the cover 10 engage in corresponding slots 10*b*, which are located in a wall 15 surrounding the inlet mouth 4. The wall 15 of the inlet mouth 4 forms a component of the housing body 5.

In addition, the design is such that the compartment 11 for the receptacle of the emergency energy source 9 extends predominantly perpendicular to a locking mechanism level E, as can be seen predominantly from the sectional view in FIG. 4. In fact, the locking mechanism level E is spanned by the locking mechanism 2, 3 consisting of catch 2 and pawl 3. This means that the compartment 11 and the emergency energy source 9 arranged therein utilize the fact that there are generally no further aggregates inside the motor vehicle lock housing 5, 6 in an area perpendicular to the locking mechanism level E and in projection below the inlet mouth 4, such that the compartment 11 and with it the emergency energy source 9 can be arranged in this area perpendicular to the locking mechanism level E and subsequently to the inlet mouth 4 or in its vertical projection. The compartment 11, like the wall 15 of the inlet mouth 4, is a component of the housing body 5.

Figure 2:
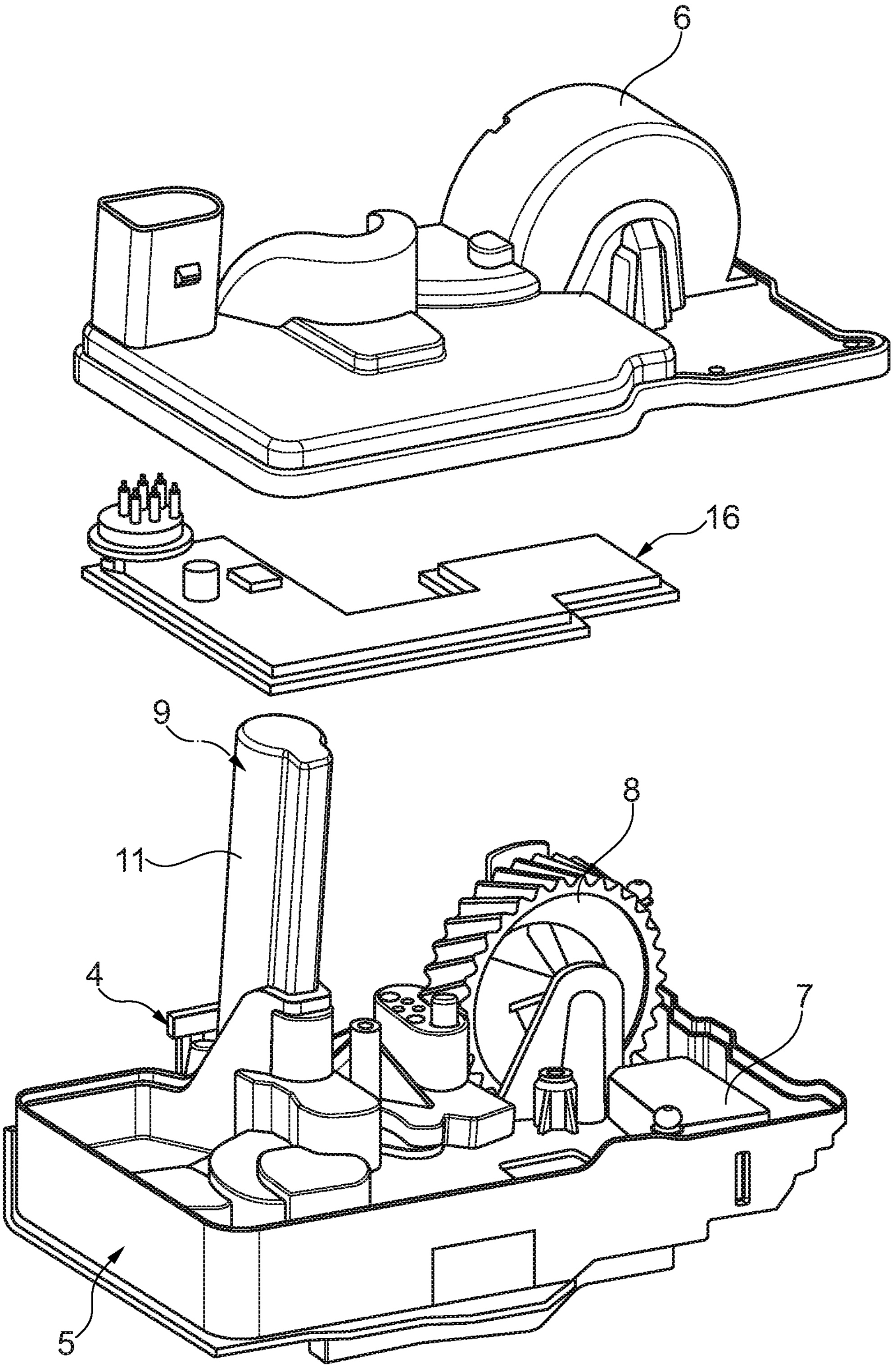
FIG. 2 shows an exploded view of the motor vehicle lock according to FIG. 1

The housing body 5 defines a wet room housing part of the lock housing 5, 6, whereas the housing cover 6 closing the housing body 5 describes an associated dry room housing part of the motor vehicle lock housing 5, 6. This is best illustrated by FIG. 2. This means that the part of the housing body 5 that is closed with the aid of the housing cover 6, in which the electromotive drive 7, 8 and additionally a control unit 16 shown here are located, represents the dry room housing part of the motor vehicle lock housing 5, 6, which is hermetically sealed with the aid of the housing cover 6. In contrast, the part of the housing body 5 that points towards the lock case 1 and describes the inlet mouth 4 with the associated wall 15 is designed as a wet chamber housing part. Finally, it can also be seen that a seal 17 is provided which seals the motor vehicle lock housing 5, 6 with respect to the motor vehicle door, which is not shown, and which can be designed as an injection-molded foam seal, for example.

LIST OF REFERENCE NUMBERS

Lock case 1
Locking mechanism 2, 3
Catch 2
Pawl 3
Inlet mouth 4
Motor vehicle lock housing 5,6
Housing body 5
Housing cover 6
Electromotive drive 7,8
Electric motor 7
Driven pulley 8
Emergency power source 9
Cover 10
Guide tongues 10*a*
Slots 10*b*
Compartment 11
Recess 12
Latching cams 13
Recess 14
Wall 15
Control unit 16
Seal 17
locking mechanism level E

The invention claimed is:

1. A motor vehicle lock comprising:
a locking mechanism,
an electromotive drive that operates the locking mechanism,
an electrical emergency energy source for emergency operation of the electromotive drive, and
a motor vehicle lock housing,
a compartment that receives the emergency energy source, and
a detachable cover that closes over an opening of the compartment,
wherein the emergency energy source is arranged in an interior of the motor vehicle lock housing,
wherein the emergency energy source is arranged in an area of an inlet mouth defined by the locking mechanism, and
wherein the opening is formed in a wall of the inlet mouth.

2. The motor vehicle lock according to claim 1, wherein the inlet mouth receives a lock holder, and the cover is arranged in a recess formed in the wall of the inlet mouth.

3. The motor vehicle lock according to claim 1, wherein the cover is equipped with guide tongues on both sides.

4. The motor vehicle lock according to claim 3, wherein the cover is designed as a sliding bar.

5. The motor vehicle lock according to claim 1, wherein the cover closes the compartment that receives the emergency energy source on a head side of the emergency energy source.

6. The motor vehicle lock according to claim 5, wherein the compartment extends perpendicular to a plane of the locking mechanism.

7. The motor vehicle lock according to claim 5, wherein the motor vehicle lock housing includes a housing body and the compartment is a component of the housing body.

8. The motor vehicle lock according to claim 7, wherein the housing body defines a wet room housing part of the motor vehicle lock housing.

9. The motor vehicle lock according to claim 7, wherein the motor vehicle lock housing further includes a housing cover and the housing body is closed by the housing cover.

10. The motor vehicle lock according to claim 9, wherein the housing cover defines a dry room housing part that is separated from the wet room housing part and that houses the electromotive drive.

11. The motor vehicle lock according to claim 7, wherein the cover is equipped with guide tongues on both sides, and the guide tongues engage with slots located on the housing body.

12. The motor vehicle lock according to claim 11, wherein the slots are located in a wall of the housing body surrounding the inlet mouth.

13. The motor vehicle lock according to claim 1, further comprising a seal that is attached to the motor vehicle lock housing.

14. A motor vehicle lock comprising:

a locking mechanism, an electromotive drive that operates the locking mechanism, an electrical emergency energy source for emergency operation of the electromotive drive, and a motor vehicle lock housing, wherein the emergency energy source is arranged in an interior of the motor vehicle lock housing, and wherein the emergency energy source is arranged in an area of an inlet mouth defined by the locking mechanism, further comprising a compartment that receives the emergency energy source, and a detachable cover that closes over the compartment, wherein the cover closes the compartment that receives the emergency energy source on a head side of the emergency energy source, wherein the motor vehicle lock housing includes a housing body and the compartment is a component of the housing body, wherein the cover is equipped with guide tongues on both sides, and the guide tongues engage with slots located on the housing body, and wherein the slots are located in a wall of the housing body surrounding the inlet mouth.

* * * * *